US012031359B2

(12) United States Patent
Matsuda et al.

(10) Patent No.: US 12,031,359 B2
(45) Date of Patent: Jul. 9, 2024

(54) OPERATION RELAY DEVICE FOR MOTOR-VEHICLE DOOR LATCH

(71) Applicant: MITSUI KINZOKU ACT CORPORATION, Yokohama (JP)

(72) Inventors: Yosuke Matsuda, Yokohama (JP); Tatsuya Takayama, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 290 days.

(21) Appl. No.: 17/624,214

(22) PCT Filed: Jun. 18, 2020

(86) PCT No.: PCT/JP2020/023920
§ 371 (c)(1),
(2) Date: Dec. 30, 2021

(87) PCT Pub. No.: WO2021/049121
PCT Pub. Date: Mar. 18, 2021

(65) Prior Publication Data
US 2022/0349218 A1 Nov. 3, 2022

(30) Foreign Application Priority Data

Sep. 13, 2019 (JP) ................................. 2019-166862

(51) Int. Cl.
*E05B 79/06* (2014.01)
*E05B 85/12* (2014.01)

(52) U.S. Cl.
CPC .............. *E05B 79/06* (2013.01); *E05B 85/12* (2013.01)

(58) Field of Classification Search
CPC .......... E05B 79/06; E05B 85/12; E05B 79/04; E05B 79/20; E05B 79/22; E05B 83/38; B60J 5/00; B60J 5/04
See application file for complete search history.

(56) References Cited

U.S. PATENT DOCUMENTS

| 7,309,100 | B2 * | 12/2007 | Sawajiri | ................. | E05B 83/38 |
| | | | | | 292/DIG. 3 |
| 10,954,700 | B2 * | 3/2021 | Tamura | ................. | B60J 5/0479 |
| 2006/0192392 | A1 | 8/2006 | Stiglich | | |

FOREIGN PATENT DOCUMENTS

| JP | 2002-147069 | 5/2002 |
| JP | 2009-243150 | 10/2009 |

(Continued)

OTHER PUBLICATIONS

International Search Report for PCT/JP2020/023920 dated Aug. 11, 2020, 6 pages.

(Continued)

*Primary Examiner* — Michael P Ferguson
*Assistant Examiner* — Thomas L Neubauer
(74) *Attorney, Agent, or Firm* — NIXON & VANDERHYE

(57) ABSTRACT

An operation relay device for a motor-vehicle door latch includes a base fixed to a door panel of a door, an operation handle pivotably supported to the base, and a link lever transmitting an opening operation by the operation handle to a door latch. The base includes a plurality of fixing parts, and the operation handle is pivotably supported at a position deviating from a center in a front-rear direction on the base, so that a center of gravity of the operation relay device is in a side of the deviating position. The fixing parts except a specific fixing part are respectively fixed to the door panel by a bolt. The specific fixing part is a temporary fixing piece that is integrally formed on the upper portion of the base to be capable of engaging with an engaging hole formed on the door panel.

1 Claim, 7 Drawing Sheets

(56) References Cited

FOREIGN PATENT DOCUMENTS

| | | |
|---|---|---|
| JP | 2014-196025 | 10/2014 |
| KR | 10-2005-0070464 | 7/2005 |
| WO | 2017/130362 | 8/2017 |

OTHER PUBLICATIONS

Written Opinion of the ISA for PCT/JP2020/023920 dated Aug. 11, 2020, 3 pages.

* cited by examiner

OPERATION RELAY DEVICE FOR MOTOR-VEHICLE DOOR LATCH

CROSS-REFERENCE TO RELATED APPLICATIONS

This application is the U.S. national phase of International Application No. PCT/JP2020/023920 filed Jun. 18, 2020 which designated the U.S. and claims priority to Japanese Patent Application No. 2019-166862 filed Sep. 13, 2019, the entire contents of each of which are hereby incorporated by reference.

BACKGROUND OF THE INVENTION

Field of the Invention

The present invention relates to an operation relay device for a motor-vehicle door latch, the operation relay device having an improved fixing operation efficiency.

Description of the Related Art

Conventionally, regarding a motor vehicle comprising side doors of which a front door and a rear door can be opened on both sides, the rear door can be held in a closed state by engaging door latches respectively provided on upper and lower portions of the rear door with corresponding strikers provided on upper and lower portions of a doorway of a vehicle body (see JP 2014-196025 A).

Moreover, the rear door is provided with an operation relay device to link an inside handle capable of operating the door to open with the upper and lower door latches respectively. An actuating force on the inside handle by an opening operation of the door is transmitted to the upper and lower door latches respectively via the operation relay device, each engaging state of the upper and lower door latches with the corresponding upper and lower strikers is released, and the rear door can be shifted from a closed state to an open state.

The operation relay device has a formation that the inside handle is pivotably supported to a base fixed to a door panel of the rear door by a shaft in a vertical direction, and a link lever actuated by the opening operation of the door on the inside handle is respectively linked with the upper and lower door latches via each Bowden cable.

SUMMARY OF THE INVENTION

Generally, although the base is fixed to the door panel at its upper and lower portions or peripheral portion with two to four pieces of bolts to fix the operation relay device to the door panel, in many cases, a center of gravity of the operation relay device is positioned in either front or rear side from a center in a front-rear direction on the base.

Thus, although a mounting hole in the upper portion of the base is made to communicate with a screw hole of the door panel to temporarily fix the operation relay device by screwing it through the communicating holes with bolts at first when the operation relay device is fixed to the door panel, in the case that this temporary fixing position screwed by the bolt deviates from the center of gravity of the operation relay device in the front-rear direction, when the operation relay device is temporarily fixed, the operation relay device pivots such that the center of gravity moves (frontward or rearward) around the bolt (the temporary fixing position) to a position just below the temporary fixing position. Consequently, other mounting holes of the base deviate from the corresponding screw holes of the door panel. Therefore, it is necessary to adjust the mounting hole of the base to the screw hole of the door panel when the second bolt is screwed, and the fixing operation cannot be smoothly carried out.

In view of the above disadvantages of the conventional techniques, an object of the present invention is to provide an operation relay device for a motor-vehicle door latch, the operation relay device having an improved fixing operation efficiency.

An operation relay device for a motor-vehicle door latch according to the present invention, comprises a base fixed to a door panel of a door capable of opening and closing a doorway of a vehicle body, an operation handle pivotably supported to the base for an opening operation of the door, and a link lever pivotably supported to the base to be capable of transmitting the opening operation of the door by the operation handle to a door latch, wherein the base is provided with a plurality of fixing parts distributed at its upper and lower portions to be fixed to the door panel by each of the fixing parts, and the operation handle is pivotably supported at a position deviating to either front or rear side from a center in a front-rear direction on the base, so that a center of gravity of the operation relay device is in the side of the deviating position on the base, wherein the plurality of the fixing parts except a specific fixing part are respectively fixed to the door panel by a bolt, and wherein the specific fixing part is a temporary fixing piece that is integrally formed on the upper portion of the base to be capable of engaging with an engaging hole formed on the door panel.

According to the present invention, it is possible to improve a fixing operation efficiency of an operation relay device for a motor-vehicle door latch.

DESCRIPTION OF THE PREFERRED EMBODIMENTS

The present invention is explained in detail by referring to an embodiment according to the present invention shown in FIGS. 1 to 8 as follows. However, the inventions recited in claims are not limited to the following embodiment. Incidentally, in the following explanation, a direction is explained on the basis of that shown in each drawing. Moreover, in the following explanation, a state shown from a vehicle interior side is described as that in a right-side view.

Figure 1:
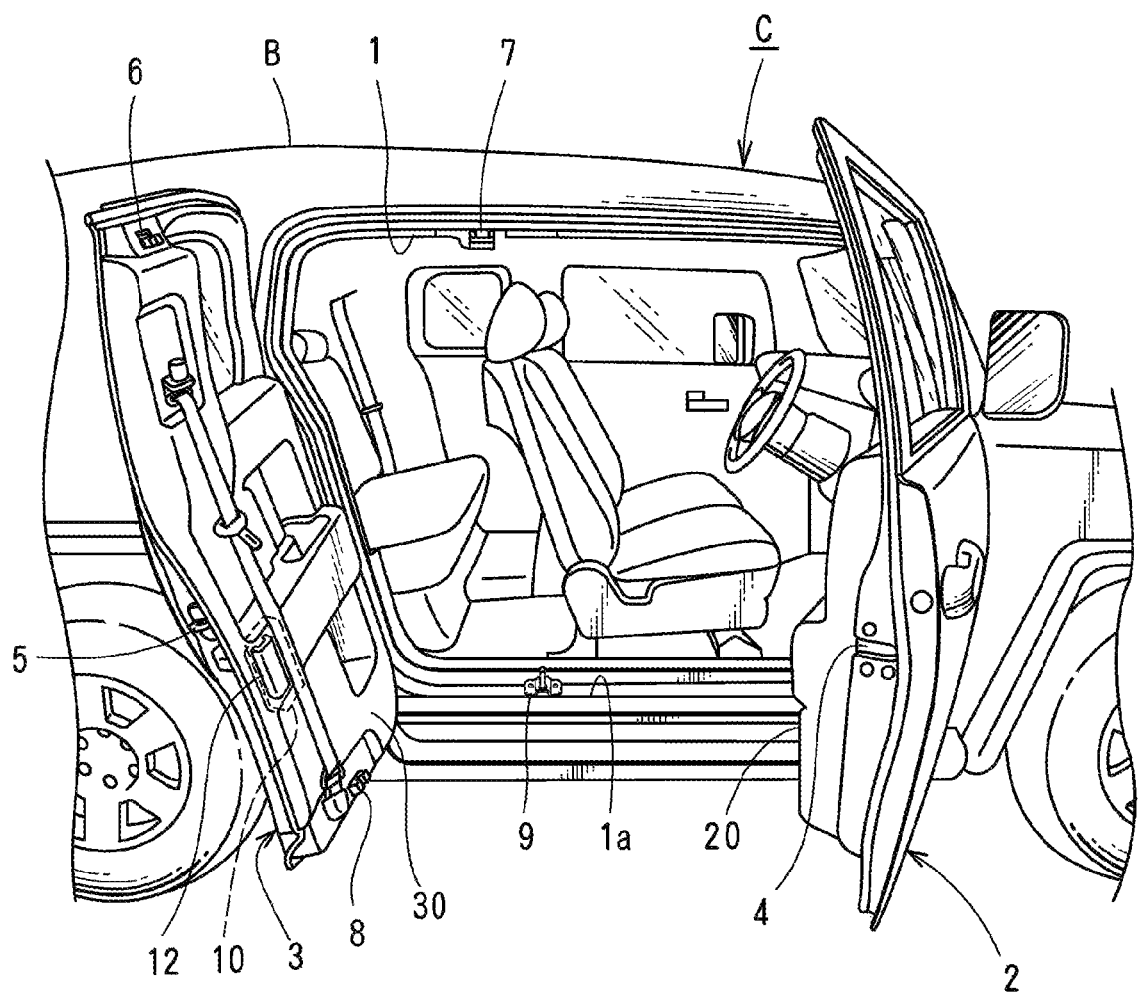
FIG. 1 is a left-side elevational view showing a vehicle to which an operation relay device of the present invention is applied.

As shown in FIG. 1, a vehicle C is formed with a center pillar-less doorway 1 on a side face of a vehicle body B, and front and rear doors 2, 3 are provided in this doorway 1 so as to open on both sides.

The front door 2 is provided with a vertical door hinge (not shown) on a front end thereof so as to be pivotably supported to the vehicle body B, and is capable of opening and closing around the front end. Moreover, the front door 2 is provided with a middle door latch 4 on an internal rear end thereof, and when the rear door 3 is in a closed state, the middle door latch 4 engages with a middle striker 5 that is fixed to a front end surface of the rear door 3 by bolts to hold the front door 2 in a closed state.

The rear door 3 is provided with a vertical door hinge (not shown) on a rear end thereof so as to be pivotably supported to the vehicle body B, and is capable of opening and closing around the rear end. Moreover, the rear door 3 is respectively provided with an upper door latch 6 on an upper front side portion thereof and a lower door latch 8 that is provided on a lower front side portion of an inner panel 30 in the vehicle interior side. The upper door latch 6 engages with an upper striker 7 that is fixed to an upper edge of the doorway 1 of the vehicle body B by bolts while the lower door latch 8 engages with a lower striker 9 that is fixed to a lower edge 1a of the doorway 1 of the vehicle body B by bolts, and thus the rear door 3 is held in a closed state.

Moreover, an operation relay device 10 linking with the upper and lower door latches 6, 8 respectively is provided on a middle portion in a vertical direction in a front end portion of the rear door 3 and is provided with an inside handle 12 as a component, and a part of the inside handle 12 (an operating portion 12a described below) is exposed from the inner panel 30.

(Operation Relay Device 10)

Figure 7:
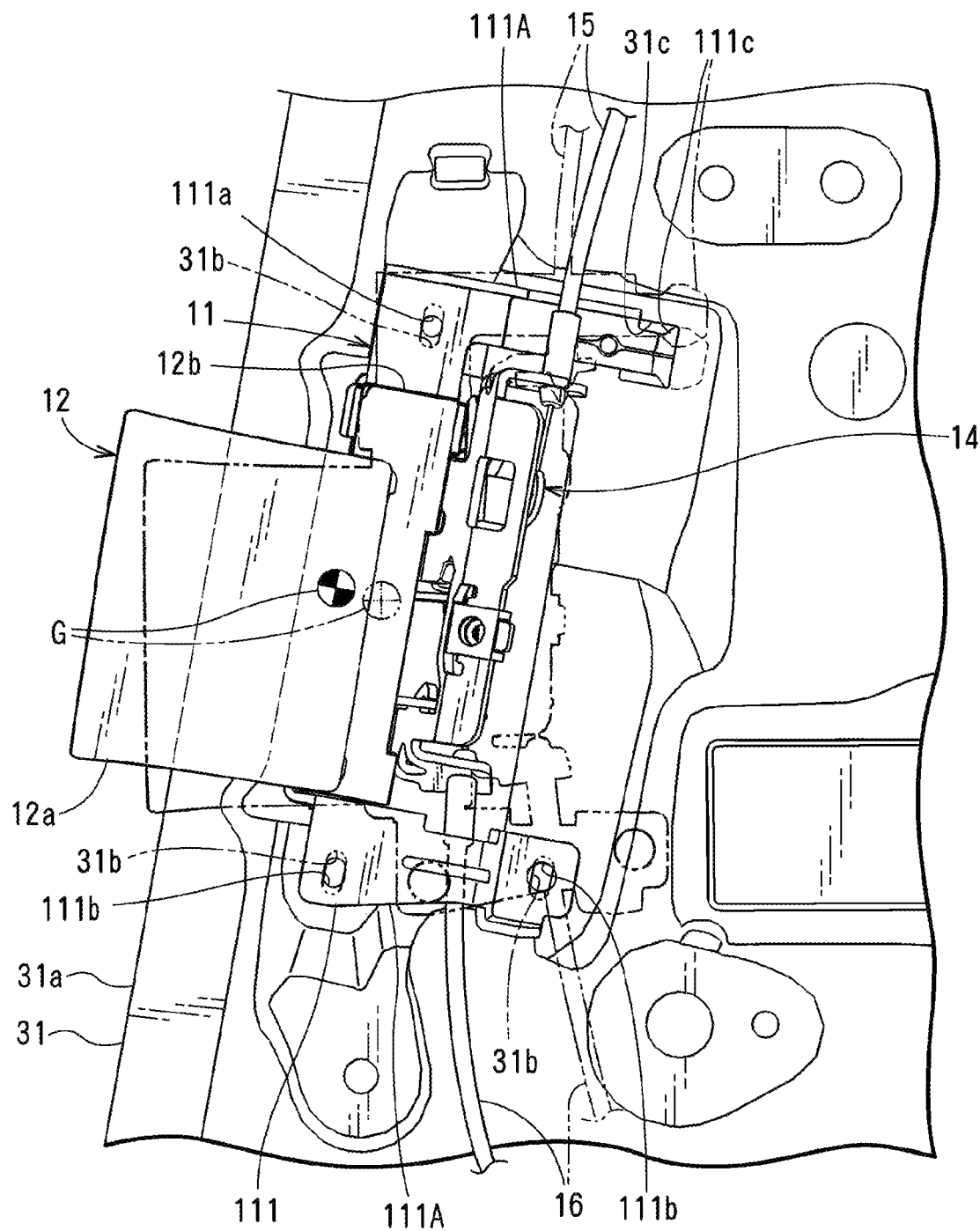
FIG. 7 is a right-side elevational view showing a state that the operation relay device of the present invention is fixed to a door panel.

The operation relay device 10 is obliquely arranged on an outer panel 31 of the rear door 3 along a front edge 31a inclined in a rear upward direction (see FIG. 7).

Figure 2:
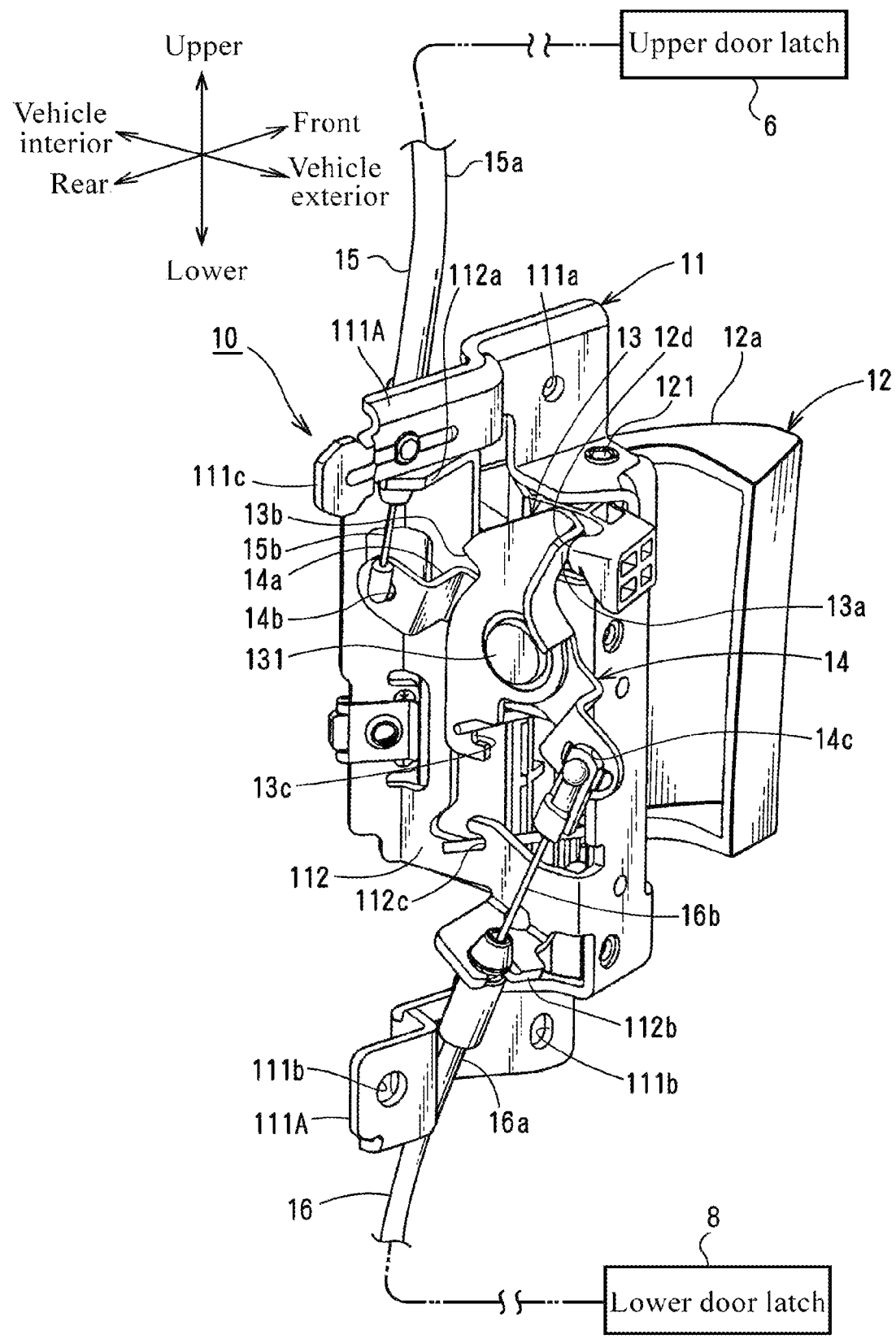
FIG. 2 is a perspective view showing the operation relay device of the present invention.

As shown in FIG. 2, the operation relay device 10 comprises a base 11 fixed to an inner surface of the outer panel 31 of the rear door 3, the inside handle 12 possible to be operated, a first and a second link lever 13, 14 to which an actuating force on the inside handle 12 by an opening operation of the door is transmitted, an upper cable 15 linking the second link lever 14 with the upper door latch 6, and a lower cable 16 linking the second link lever 14 with the lower door latch 8.

(Base 11)

The base 11 is made of a single metal plate and is formed by a bending process such as bending, a combination of cutting and bending, and so on. The base 11 comprises a first face part 111 that is formed in a lateral U-like shape with the right side open in the right-side view and is provided with the inside handle 12 (see FIG. 3), and a second face part 112 that is substantially perpendicular to the first face part 111 and is provided with the first and second link levers 13, 14 (see FIGS. 2, 5).

Figure 3:
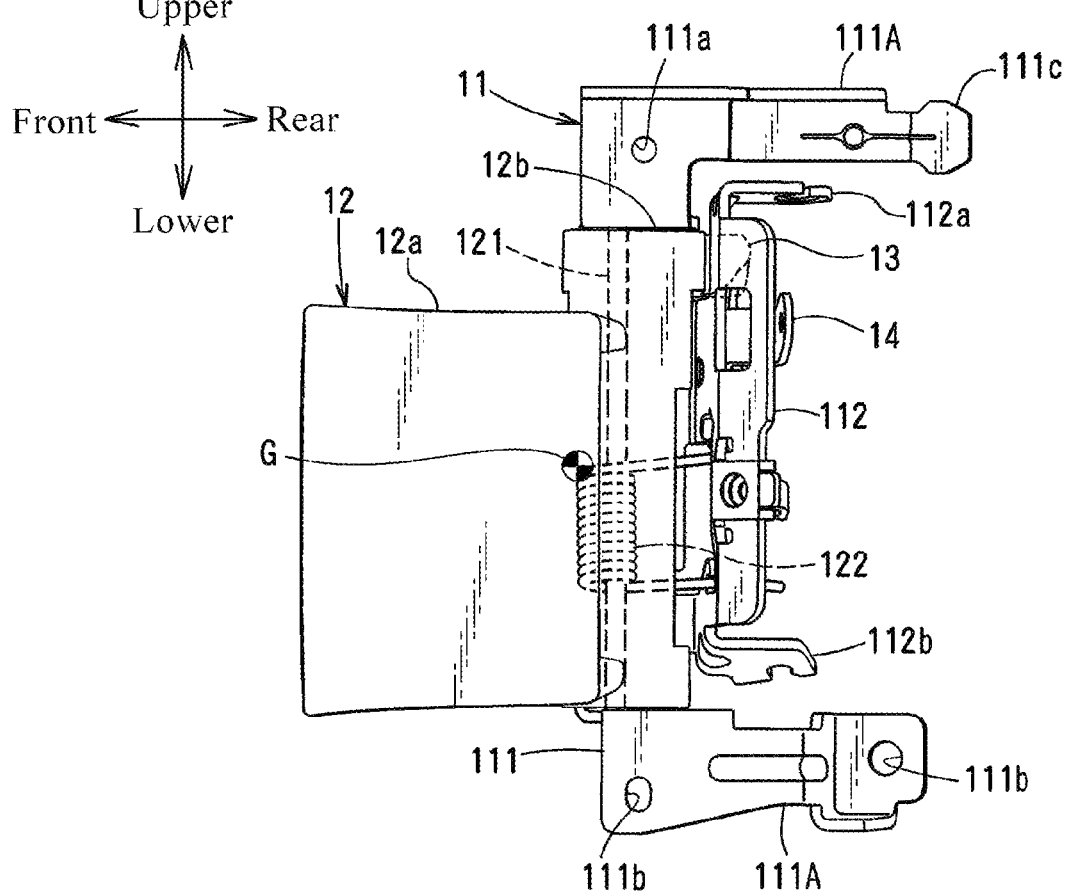
FIG. 3 is a right-side elevational view showing the operation relay device of the present invention.

As shown in FIG. 3, the base 11 comprises arm parts 111A, 111A respectively projecting rearward from the upper and lower portions of the first face part 111. A front side (base end side) of the upper arm part 111A is formed with an upper insertion hole (fixing part) 111a into which a bolt S can be inserted (see FIG. 8), and a rear side (tip side) of the upper arm part 111A is formed with a temporary fixing piece (specific fixing part) 111c extending rearward in a crank shape. A front side (base end side) and a rear side (tip side) of the lower arm part 111A are respectively formed with lower insertion holes 111b, 111b (fixing parts) into which other bolts S can be inserted respectively. As described below, the base 11 is fixed to the outer panel 31 by supporting at four points on the front and rear sides of each of the upper and lower arm parts 111A, 111A.

Figure 5:
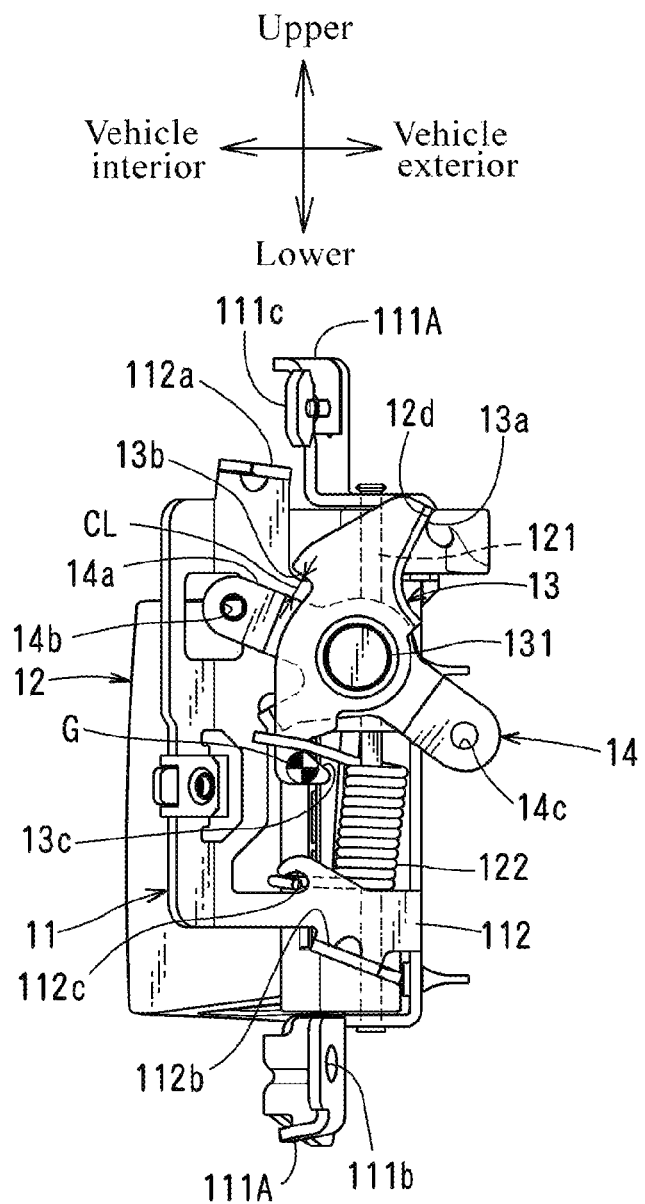
FIG. 5 is a rear elevational view showing the operation relay device of the present invention.

As shown in FIGS. 2, 5, an upper portion of the second face part 112 of the base 11 is formed with an upper-cable fixing part 112a bent rearward to which an end portion of an outer tube 15a of the upper cable 15 is fixed, a lower portion of the second face part 112 of the base 11 is formed with a lower-cable fixing part 112b bent rearward to which an end portion of an outer tube 16a of the lower cable 16 is fixed, and the lower portion of the second face part 112 is also formed with a spring engaging portion 112c with which an end portion in a lower side of a torsion coil spring 122 described below is engaged.

(Inside Handle 12)

The inside handle 12 (operation handle) is formed by an insert molding method from a synthetic resin material, and is pivotably supported to the first face part 111 of the base 11 by a shaft 121 in the vertical direction provided on the base 11.

As shown in FIG. 3, the inside handle 12 comprises the operating portion 12a that is operated to open the door by an occupant, a supported portion 12b that is pivotably supported by the shaft 121 in the vertical direction provided on the first face part 111 of the base 11, and an actuating portion 12d (see FIGS. 2, 5) that transmits the actuating force by engaging with the first link lever 13. A coil part of the torsion coil spring 122 is fitted to the shaft 121 with looseness.

Figure 4:
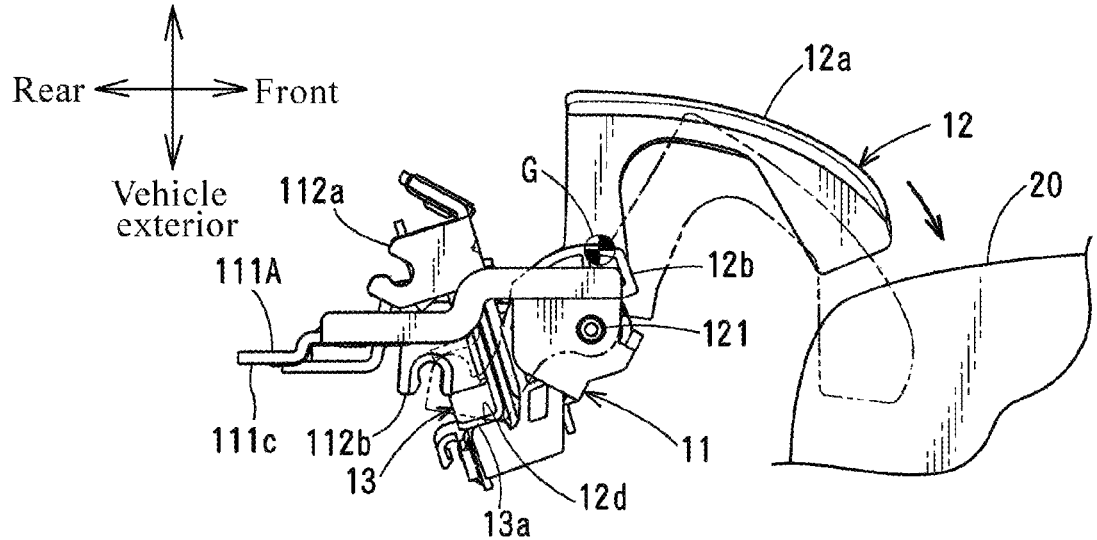
FIG. 4 is a top plan view showing the operation relay device of the present invention.

As shown in FIG. 4, the operating portion 12a is formed in a substantially hook-like shape in the top plan view, and a base end portion (rear end portion) of the operating portion 12a is united with the supported portion 12b.

The inside handle 12 is pivotable between an initial position shown by a solid line in FIG. 4 and an actuating position shown by an imaginary line in FIG. 4, wherein when the inside handle 12 is in the initial position, a front end portion of the operating portion 12a is in proximity to a rear end portion of an inner panel 20 of the front door 2 that is in a fully closed state while clearance is provided between the front end portion of the operating portion 12a and the rear end portion of the inner panel 20, and wherein when the front door 2 is in an open state, the inside handle 12 pivots in a clockwise direction in FIG. 4 to the actuating position to actuate the first link lever 13 (to engage the first link lever 13 with the second link lever 14 to rotate). As described above, since the inside handle 12 in the initial position is in proximity to the inner panel 20 of the front door 2 in the fully closed state via the clearance, the inside handle 12 slightly pivots corresponding to the clearance. However, the inside handle 12 is regulated so as not to pivot to the actuating position.

Incidentally, when the front door 2 is in an ajar state, a gap larger than the clearance when the front door 2 is in the fully closed state occurs between the front end portion of the operating portion 12a of the inside handle 12 and the rear end portion of the inner panel 20 of the front door 2.

In this manner, in the present embodiment, when the front door 2 is in the fully closed state or the ajar state, the clearance or the gap is provided between the front end portion of the operating portion 12a of the inside handle 12 and the rear end portion of the inner panel 20 of the front door 2. Thus, corresponding to the clearance or the gap, the opening operation of the door by the inside handle 12 is possible such that the pivoting is allowed. Then, although the first link lever 13 sometimes somewhat pivots and there is concern that the second link lever 14 follows the first link lever 13, the following of the second link lever 14 is prevented by providing some clearance CL between the first link lever 13 in the initial position and the second link lever 14 as described below.

(First Link Lever 13)

As shown in FIG. 2, the first link lever 13 is made of a metal plate and is pivotably supported to the second face part 112 of the base 11 by a rivet shaft 131. The first link lever 13 comprises an actuated portion 13a engaging with the actuating portion 12d of the inside handle 12, an abutting portion 13b engaging with the second link lever 14 to transmit the actuating force from the inside handle 12, and a spring engaging portion 13c with which another end portion in an upper side of the torsion coil spring 122 engages.

As shown in FIG. 5, the actuated portion 13a of the first link lever 13 is arranged on a movement locus of the actuating portion 12d at the time of pivoting of the inside handle 12, and in front of the actuating portion 12d of the inside handle 12 in the initial position.

The first link lever 13 is pivotable between an initial position where the first link lever 13 is biased in a clockwise direction in FIG. 5 by the torsion coil spring 122 to be held and an actuating position where the first link lever 13 is made to pivot in a counterclockwise direction in FIG. 5 to actuate the second link lever 14 (to pull the upper cable 15 and the lower cable 16).

As described above, while the first link lever 13 is in the initial position to be biased in the clockwise direction in FIG. 5 by the torsion coil spring 122, since the inside handle 12 is kept to be biased in the counterclockwise direction in FIG. 4 by the first link lever 13, the inside handle 12 is held in the initial position.

(Second Link Lever 14)

As shown in FIG. 2, the second link lever 14 is made of a metal plate and is pivotably supported by the rivet shaft 131 that is common to the first link lever 13. The second link lever 14 is arranged in a backside (front side in the front-rear direction of the vehicle) of the first link lever 13 on the shaft. The second link lever 14 comprises an abutted portion 14a engaging with the abutting portion 13b of the first link lever 13, an upper-cable coupling part 14b to which an end portion of an inner cable 15b of the upper cable 15 can be fixed, and a lower-cable coupling part 14c to which an end portion of an inner cable 16b of the lower cable 16 can be fixed.

As shown in FIG. 5, the abutted portion 14a of the second link lever 14 is arranged on a movement locus of the abutting portion 13b at the time of pivoting of the first link lever 13, and in the vehicle interior side of the abutting portion 13b of the first link lever 13 in the initial position. Moreover, some clearance CL (such as a degree of a few mm) is provided between the abutted portion 14a and the abutting portion 13b of the first link lever 13 in the initial position.

As described above, when the front door 2 is in the fully closed state or the ajar state, the first link lever 13 sometimes somewhat pivots owing to the opening operation of the door by the inside handle 12. Thus, there is concern that the second link lever 14 follows the first link lever 13 (pivoting). Then, the upper and lower cables 15, 16 linking with the corresponding upper and lower door latches 6, 8 are pulled, and each engaging state of the upper and lower door latches 6, 8 with the corresponding upper and lower strikers 7, 9 is sometimes released. However, the following of the second link lever 14 is prevented by providing the some clearance CL between the first link lever 13 in the initial position and the second link lever 14 as described below.

In the present embodiment, since the clearance CL is provided between the abutting portion 13b of the first link lever 13 and the abutted portion 14a of the second link lever 14, even if the first link lever 13 somewhat pivots as in the above-described case when the front door 2 is in the fully closed state or the ajar state, the abutting portion 13b of the first link lever 13 does not engage with the abutted portion 14a of the second link lever 14, the second link lever 14 does not pivot, and thereby not releasing each engaging state of the upper and lower door latches 6, 8 with the corresponding upper and lower strikers 7, 9. Namely, in the present embodiment, it is capable of preventing the rear door 3 from an open state by a wrong operation of the inside handle 12 owing to the ajar state of the front door 2 and so forth.

(Actuation to Inside Handle 12 by Opening Operation of Door)

In the operation relay device 10, when the inside handle 12 is operated to open the door while the front door 2 is in the open state and the inside handle 12 pivots against a biasing force of the torsion coil spring 122 from the initial position to the actuating position, the actuating portion 12d of the inside handle 12 engages with the actuated portion 13a of the first link lever 13 to make the first link lever 13 pivot in the counterclockwise direction in FIG. 5. By pivoting of the first link lever 13, the abutting portion 13b of the first link lever 13 engages with the abutted portion 14a of the second link lever 14, and the second link lever 14 pivots in the counterclockwise direction in FIG. 5. By pivoting of the second link lever 14, the upper-cable coupling part 14b and the lower-cable coupling part 14c respectively pivot downward and upward, and therefore the inner cable 15b of the upper cable 15 and the inner cable 16b of the lower cable 16 are respectively pulled downward and upward. Accordingly, the engagement state between the upper door latch 6 and the upper striker 7 is released, the engagement state between the lower door latch 8 and the lower striker 9 is released, and it is possible to shift the rear door 3 from the closed state to the open state.

(Center of Gravity of Operation Relay Device 10)

A center of gravity G is shown on the operation relay device 10 in FIGS. 3 to 7.

Figure 6:
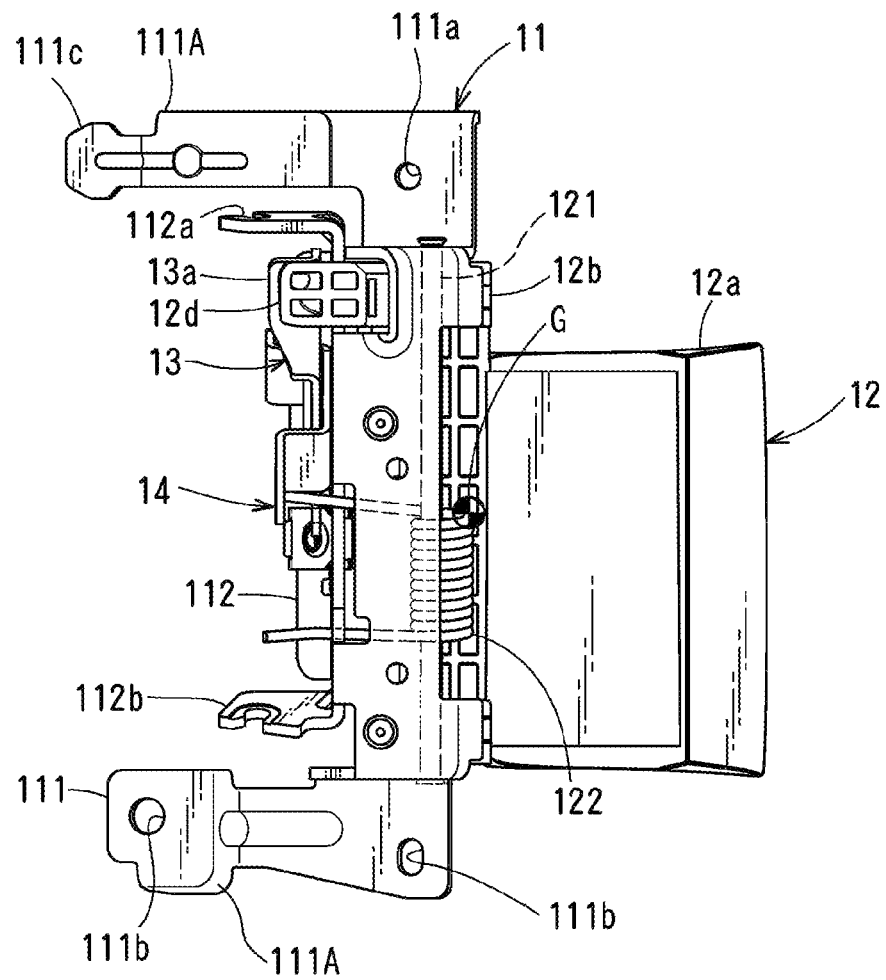
FIG. 6 is a left-side elevational view showing the operation relay device of the present invention.

In FIGS. 3, 6, 7, the center of gravity G is positioned on a substantially middle portion in the vertical direction in a front end portion of the base 11 (in the vicinity of the combined portion between the operating portion 12a and the supported portion 12b of the inside handle 12 in the side view). In FIG. 4, the center of gravity G is positioned on the combined portion between the operating portion 12a and the supported portion 12b of the inside handle 12 in the top plan view. In FIG. 5, the center of gravity G is positioned on the spring engaging portion 13c of the first link lever 13 in the rear elevational view.

As shown in FIG. 7, the operation relay device 10 is previously assembled by all members (the base 11, the inside handle 12, the first and second link levers 13, 14, and the upper and lower cables 15, 16), and is fixed to the outer panel 31 so as to be inclined in the rear upward direction with the previously assembled state.

As shown in FIG. 7, the center of gravity G shown by a solid line of the operation relay device 10 is positioned in a front downward side regarding the upper insertion hole 111a of the base 11, wherein the upper insertion hole 111*a* is used when the operation relay device 10 is temporarily fixed to the outer panel 31.

In such a case that the upper insertion hole 111*a* used as a temporary fixing position of the base 11 deviates from the center of gravity G in the front-rear direction, when assuming that the operation relay device 10 is temporarily fixed to the outer panel 31 by inserting the bolt S into the upper insertion hole 111*a* without using the temporary fixing piece 111*c* of the base 11, the operation relay device 10 pivots in the counterclockwise direction in FIG. 7 (moves rearward) around the temporary fixing position (the upper insertion hole 111*a*) and shifts to a position shown by an imaginary line as shown in FIG. 7. Thus, the lower insertion holes 111*b*, 111*b* of the base 11 significantly deviate from respective corresponding screw holes 31*b*, 31*b* of the outer panel 31. Therefore, to fix with screws, it is necessary to make the operation relay device 10 pivot in the clockwise direction in FIG. 7 (moves it frontward) to communicate the lower insertion holes 111*b*, 111*b* with the respective corresponding screw holes 31*b*, 31*b*. Namely, a fixing operation efficiency of the operation relay device 10 is very low.

Figure 8:
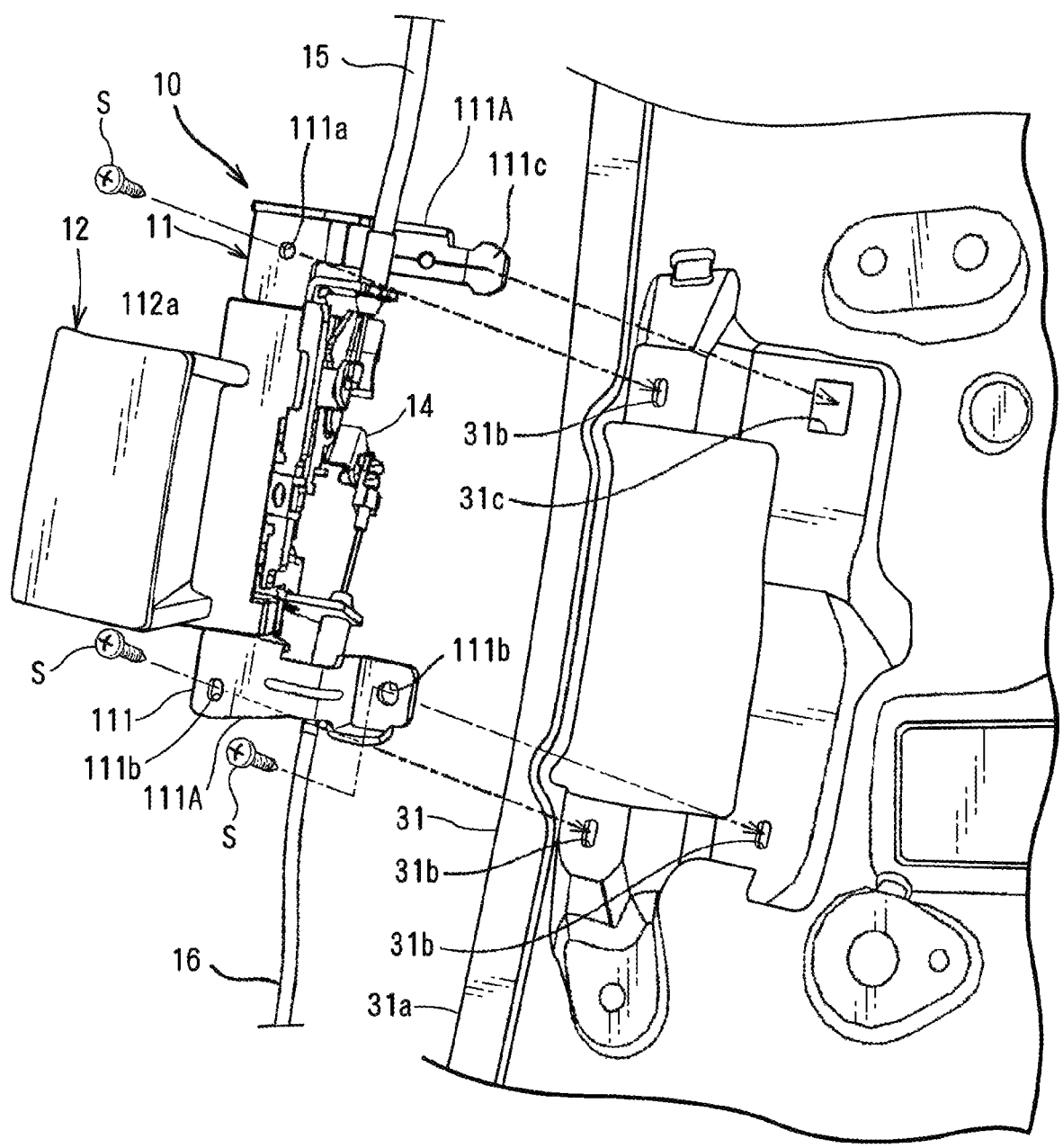
FIG. 8 is a right-side elevational view showing a situation when the operation relay device of the present invention is about to be fixed to a door panel.

In the present embodiment, as shown in FIG. 8, at first, before the operation relay device 10 is temporarily fixed to the outer panel 31 by inserting the bolt S, the temporary fixing piece 111*c* extending rearward in an upper portion of the base 11 is made to engage with an engaging hole 31*c* formed on the outer panel 31 to be inclined in a rear downward direction. At that time, the upper insertion hole 111*a* of the base 11 communicates with the corresponding screw hole 31*b* of the outer panel 31. Then, when the operation relay device 10 is temporarily fixed to the outer panel 31 by inserting the bolt S into the upper insertion hole 111*a* of the base 11, two points in an upper portion of the operation relay device 10 can be stably fixed. In that condition, since the lower insertion holes 111*b*, 111*b* communicate with the respective corresponding screw holes 31*b*, 31*b* of the outer panel 31, it is possible to easily screw the operation relay device 10 through the lower insertion holes 111*b*, 111*b* of the base 11.

Thus, even if the center of gravity G of the operation relay device 10 deviates from the upper insertion hole 111*a* of the base 11 in the front-rear direction, since the operation relay device 10 can be temporarily fixed and positioned only by temporarily fixing with the temporary fixing piece 111*c*, a position adjustment when screwing is not necessary, and it is possible to improve the fixing operation efficiency of the operation relay device 10.

Incidentally, the temporary fixing piece 111*c* is not limited to that having the above-described shape, and may be formed in a downward hook-like shape and so forth such that it can engage with the engaging hole 31*c* of the outer panel 31 from upward. The temporary fixing piece 111*c* may have any shape insofar as a rotation force of the operation relay device 10 owing to the center of gravity G can be inhibited.

Moreover, although the center of gravity G is positioned in a front end side of the base 11 because the inside handle 12 is provided on a front side of the base 11 in the present embodiment, the center of gravity G may be positioned in a rear side of the base 11 by providing the inside handle 12 on the rear side of the base 11. In this case, the arm parts 111A, 111A respectively of the upper and lower portions of the base 11 may be made to project frontward such that the base 11 is formed in a lateral U-like shape with the left side open in the right-side view.

What is claimed is:

1. An operation relay device for a motor-vehicle door latch, the operation relay device comprising:
    a base fixed to a door panel of a door configured to open and close a doorway of a vehicle body, the base comprising:
        a plurality of fixing parts distributed at upper and lower portions thereof to be fixed to the door panel by each of the fixing parts, the plurality of the fixing parts except a specific fixing part being respectively fixed to the door panel by a bolt, the specific fixing part being a temporary fixing piece that is integrally formed on the upper portion of the base to be configured to engage with an engaging hole formed on the door panel, and
        a plurality of arm parts respectively projecting rearward from the upper and lower portions, the temporary fixing piece being provided on the arm part of the upper portion;
    an operation handle pivotably supported to the base for an opening operation of the door, the operation handle being pivotably supported at a position deviating to either a front side or a rear side from a center in a front-rear direction on the base, so that a center of gravity of the operation relay device is in the side of the deviating position on the base, the center of gravity being positioned downward from the temporary fixing piece, at least one of the plurality of fixing parts being positioned downward from the center of gravity, the operation handle being pivotably supported by a shaft in a vertical direction which is provided in the front side from the center in the front-rear direction on the base, so that the center of gravity is in the front side on the base; and
    a link lever pivotably supported to the base to be configured to transmit the opening operation of the door by the operation handle to the motor-vehicle door latch.

* * * * *